United States Patent [19]

Kanemasa et al.

[11] Patent Number: 4,769,808
[45] Date of Patent: Sep. 6, 1988

[54] METHOD OF CANCELLING ECHOES IN FULL-DUPLEX DATA TRANSMISSION SYSTEM

[75] Inventors: Akira Kanemasa; Akihiko Sugiyama, both of Tokyo, Japan

[73] Assignee: NEC Corporation, Japan

[21] Appl. No.: 777,025

[22] Filed: Sep. 17, 1985

[30] Foreign Application Priority Data

Sep. 19, 1984 [JP] Japan .................................. 59-196108
Sep. 19, 1984 [JP] Japan .................................. 59-196110
Sep. 19, 1984 [JP] Japan .................................. 59-196112
Sep. 19, 1984 [JP] Japan .................................. 59-196116
Sep. 21, 1984 [JP] Japan .................................. 59-198023
Sep. 21, 1984 [JP] Japan .................................. 59-198027

[51] Int. Cl.⁴ ............................................. H04B 3/23
[52] U.S. Cl. .................................... 370/32.1; 379/410
[58] Field of Search ............. 379/399, 410, 411, 406, 379/402, 400, 398; 370/32.1

[56] References Cited

U.S. PATENT DOCUMENTS 4,571,465  2/1986  Brie et al. ........................... 370/32.1
4,621,172 11/1986  Kanemasa et al. .................. 370/32.1

OTHER PUBLICATIONS

"Digital Echo Cancellation for Baseband Data Transmission", Verhoeckx et al., IEEE Transactions on Acoustics, Speech, and Signal Processing, vol. AS-SP-27, No. 6, Dec. 1979, pp. 768-781.

Primary Examiner—Jin F. Ng
Assistant Examiner—Randall S. Vaas
Attorney, Agent, or Firm—Laff, Whitesel, Conte & Saret

[57] ABSTRACT

A first difference signal is obtained by subtracting an echo replica from a mixed signal which consists of a received signal and an echo. The echo replica is produced in an adaptive digital filter using an error signal. The first difference signal includes the received signal and a residual echo, and is delayed in a manner to produce a delayed first difference signal. The delayed first difference signal is subtracted from the first difference signal to obtain a second difference signal. Thereafter, a polarity of the residual echo included in said second difference signal is detected. The error signal is obtained based on the detected polarity, and then is applied to the adaptive digital filter.

12 Claims, 15 Drawing Sheets

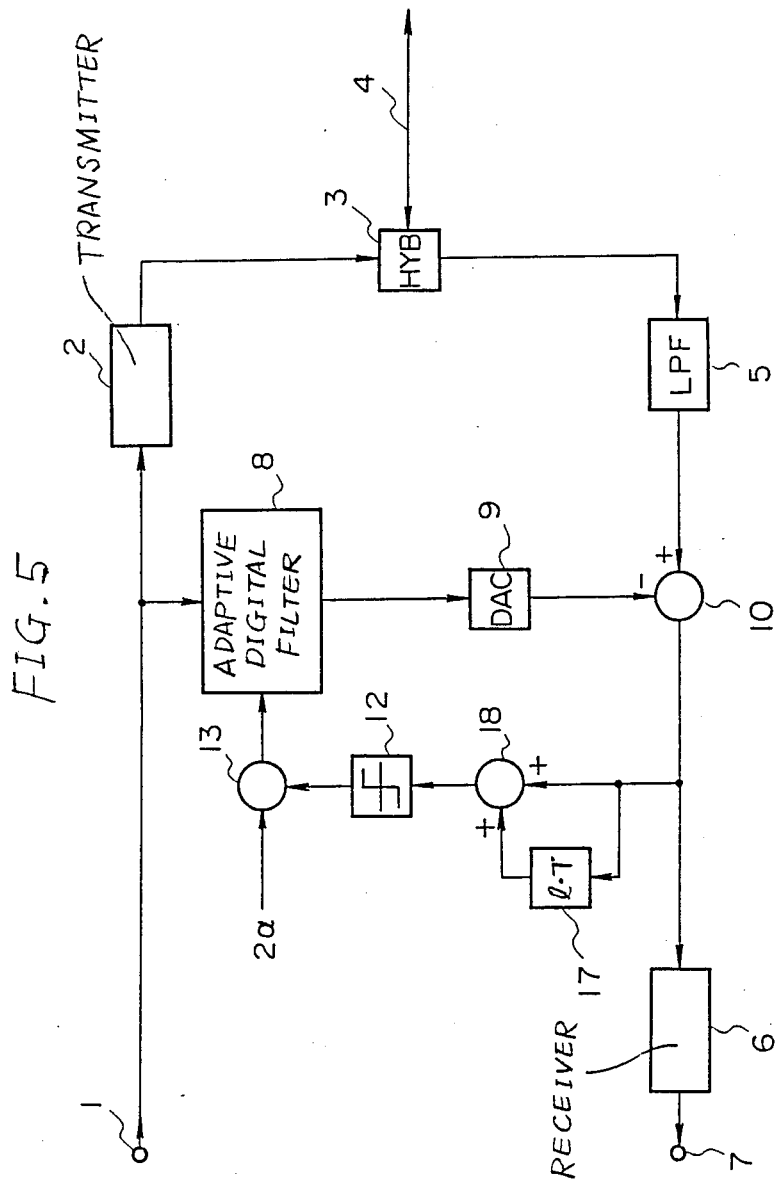

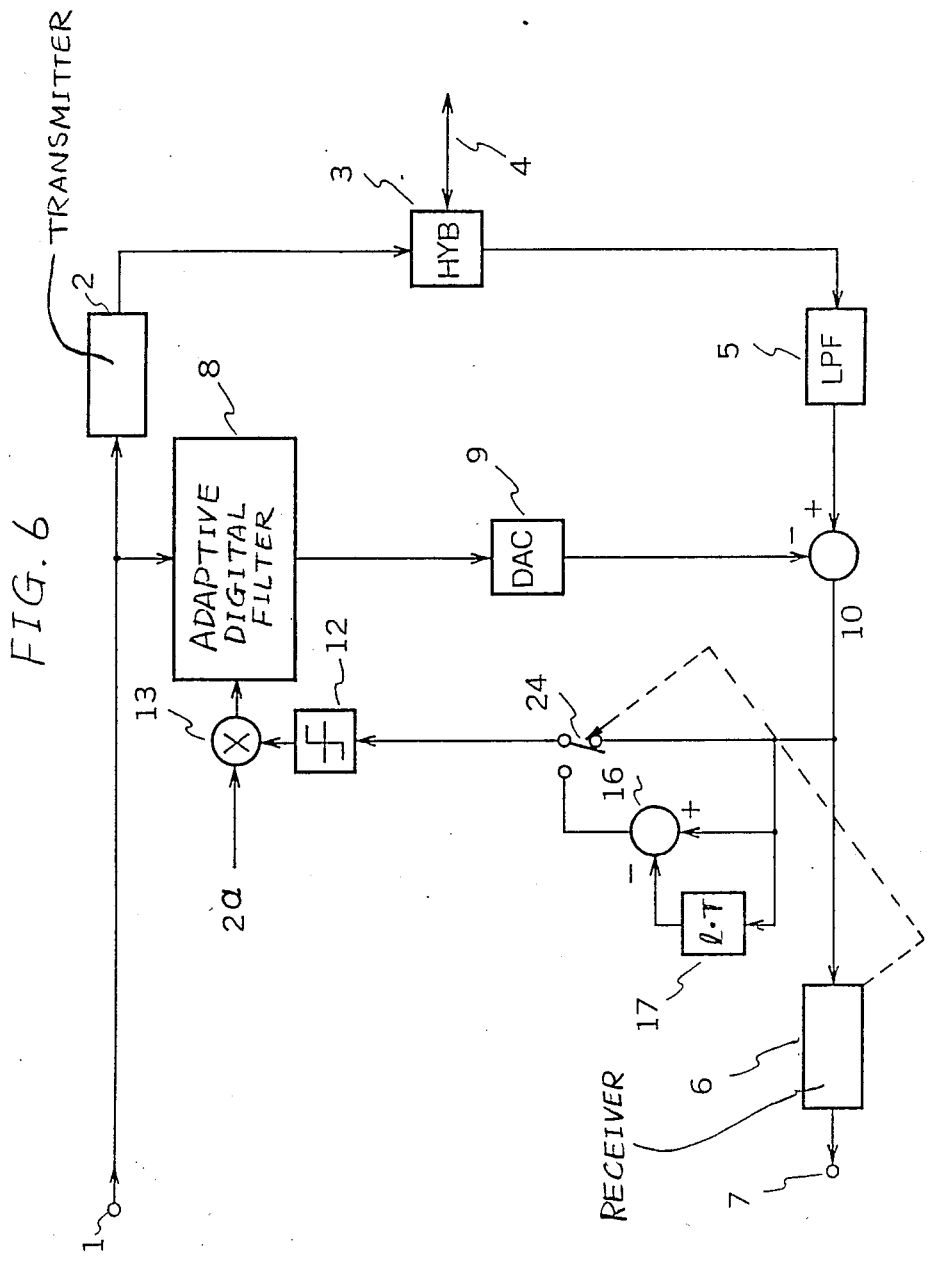

METHOD OF CANCELLING ECHOES IN FULL-DUPLEX DATA TRANSMISSION SYSTEM

BACKGROUND OF THE INVENTION

1. Field of The Invention

This invention relates to a method of cancelling echoes to achieve simultaneous two-way data transmission ("full-duplex") over a two-wire circuit.

2. Description of the Prior Art

It is known in the art to utilize echo cancellation for the purposes of simultaneous transmission of data in opposite directions over a two-wire circuit. Such a known technique has been disclosed in an article entitled "Digital Echo Cancellation for Baseband Data Transmission" in IEEE TRANSACTIONS ON ACOUSTICS, SPEECH, AND SIGNAL PROCESSING, VOL. ASSP-27, No. 6, DEC. 1979, pages 768–781.

An echo canceller is provided with an adaptive digital filter to simulate echo impulse response. The echo canceller produces an echo replica, which corresponds to input data sequence to be transmitted, for use in suppressing or nullifying an echo which has leaked into itself via a hybrid coupler which functions as a four-wire to two-wire interface. Each tap coefficient of the adaptive digital filter is successively adjusted or updated by correlating data to be transmitted and a difference signal which is obtained by the subtraction of an echo replica from a mixed signal including an echo as well as a received signal.

This technique of successively updating the tap coefficients of the adaptive filter (viz., echo canceller convergence algorithm), has been described in the above-mentioned article as "stochastic iteration algorithm" and "sign algorithm".

In order to realize a full-duplex operation of data transmission over the two-wire circuit, it is necessary to make use of LSI (Large Scale Integration) techniques, wherein A/D (Analog-to-Digital) and D/A (Digital-to-Analog) converters are required. How many bits are required by a D/A converter depends on the conditions required by a system in which the converter is used. In the case where the echo canceller is applied to subscriber's transmission systems by way of example, the D/A converter requires approximately 12 bits. On the other hand, the number of bits required by an A/D converter depends on the convergence algorithm in addition to the conditions required by the system used. In the case where the echo canceller is applied to the subscriber's transmission systems using the stochastic iteration algorithm, the A/D converter requires about 8 bits. Contrarily, the sign algorithm needs only 1 bit for A/D conversion. Further, the sign algorithm is well suited for LSI manufacturing.

The sign algorithm, however, encounters a problem in that the polarity of the difference signal is utilized to update the tap coefficients of the adaptive digital filter. More specifically, the adaptive digital filter is no longer able to operate correctly in the event that the polarity of a residual echo is not identical to that of the difference signal. For example, in the case where biphase codes are used as transmission codes, the above-mentioned problem arises when the level of residual echo reaches approximately the level of the received signal. A solution to this difficulty will be described with reference to FIG. 1 which shows, in block diagram form, a known echo canceller using the sign algorithm.

The FIG. 1 arrangement is provided at either end (west and east) of a two-wire circuit 4. Viz., in the case where the echo canceller shown in FIG. 1 is applied to a subscriber line, one is provided at a subscriber's end and the other at a telephone exchange. For ease in description, it will be assumed that transmission is implemented through baseband data.

In FIG. 1, a binary data sequence is applied, via an input terminal 1, to a transmitter 2 and also to an adaptive digital filter 8. The binary data sequence is converted, at the transmitter 2, into transmission codes which are sent over the two-wire circuit 4 to the opposite echo canceller (not shown) by way of a hybrid circuit 3. A part of the transmitted signal, however, leaks into a low-pass filter 5 (viz., echo) as a result of impedance irregularity in the hybrid circuit 3. The low-pass filter 5 suppresses frequency components outside a desired signal bandwidth. On the other hand, the signal transmitted from the opposite end enters the low-pass filter 5 via the hybrid circuit 3. As a consequence, the low-pass filter 5 outputs a mixed signal, which contains the received signal and echo and which is applied to a subtracter 10.

As shown, there is a closed-circuit which consists of the subtracter 10, an adder 11, a polarity decision circuit 12, a multiplier 13, the adaptive digital filter 8 and a D/A converter 9. This closed-circuit functions to suppress or nullify the echo present in the mixed signal applied from the low-pass filter 5. The echo cancellation is implemented by producing an echo replica in the adaptive digital filter 8 using an error signal applied thereto. The filter 8 is well known in the art and hence a detailed description thereof will be omitted for brevity.

The echo replica (digital) from the adaptive digital filter, is converted, at the D/A converter 9, into the corresponding analog echo replica. The subtracter 10 subtracts the echo replica from the mixed signal (viz., "received signal" + "echo"). The output of the subtracter 10 is therefore the aforesaid difference signal (viz., "received signal" + "residual echo"), wherein the residual echo represents ("echo" − "echo replica"). The difference signal is applied to the receiver 6, the adder 11 and also to an amplitude controller 14. The receiver 6 extracts clock signals, demodulates the received signal, and generates a reproduced signal which is fed to an output terminal 7.

The amplitude controller 14 is supplied with a random signal from a random signal generator 15, and controls the amplitude of the random signal according to the amplitude or electric power of the difference signal applied from the subtracter 10. The adder 11 receives the amplitude-controlled random signal as well as the difference signal, and add these signals. The added signal is then applied to the polarity decision circuit 12 which detects the polarity thereof. The output of the polarity decision circuit 12 is multiplied at the multiplier 13 by $2\alpha$ (where $\alpha$ is a suitable amplification factor), and is applied as an error signal to the adaptive digital filter 8. In order to assure the correct operation of the adaptive digital filter 8, it is vital to correctly detect the polarity of the residual echo at the decision circuit 12.

As mentioned above, the difference signal (viz., the output of the subtracter 10) includes the received signal. Consequently, if the difference signal is directly applied to the polarity decision circuit 12, the polarity of the residual echo is not correctly determined when the residual echo becomes sufficiently small to an extent that the level thereof approximates the level of the received signal. This means that the adaptive implementation is not carried out at the adaptive digital filter 8. In an effort to eliminate this problem, the random signal with an amplitude approximately equal to the level of the received signal is added to the difference signal. To this end, three components are added, viz., the adder 11, the amplitude controller 14 and the random signal generator 15, as shown in FIG. 1. With this arrangement there is a possibility that the received signal is cancelled. Consequently, there is a possibility that the polarity of the residual echo is correctly determined, which ensures the correct operation of the adaptive digital filter 8.

The echo canceller shown in FIG. 1, however, has encountered a problem that sophisticated and complex level control of the random signal is needed and thus results in complex and bulky hardware.

Further, with the aforesaid known echo canceller using the sign algorithm, the tap coefficients of the adaptive filter are adjusted using the polarity of the incoming error signal. Consequently, the echo canceller has encountered another problem that a large amount of time is required for convergence in that the probability of the random signal cancelling the received signal is low.

SUMMARY OF THE INVENTION

It is therefore a primary object of this invention to provide a method of cancelling echoes to realize the full-duplex data transmission over a two-wire circuit, by which method simple and small-scale hardware can be realized.

Another object of this invention is to provide an echo cancelling method which features a small amount of convergence time.

Still another object of this invention is to provide an echo cancelling method by which a simple and small-scale echo canceller can be realized together with a small amount of convergence time.

A first aspect of this invention takes the form of a method of cancelling an echo using an adaptive digital filter in full-duplex data transmission over a two-wire circuit, the adaptive digital filter updating the tap coefficients thereof by an error signal applied thereto and producing an echo replica, the method comprising the steps: (a) subtracting the echo replica from a mixed signal which consists of a received signal and the echo, and obtaining a first difference signal by the subtraction, the first difference signal including the received signal and a residual echo; (b) delaying the first difference signal in a manner to produce a delayed first difference signal; (c) obtaining a second difference signal by determining a difference between the first difference signal and the delayed first difference signal; (d) detecting a polarity of the residual echo included in the second difference signal; and (e) obtaining the error signal based on the detected polarity (FIGS. 2 and 5).

A second aspect of this invention takes the form of a method of cancelling an echo using an adaptive digital filter in full-duplex data transmission over a two-wire circuit, the adaptive digital filter updating the tap coefficients thereof by an error signal applied thereto and producing an echo replica, the method comprising the steps: (a) subtracting the echo replica from a mixed signal which consists of a received signal and the echo, and obtaining a first difference signal by the subtraction, the first difference signal including the received signal and a residual echo; (b) delaying the first difference signal in a manner to produce a delayed first difference signal; (c) obtaining a second difference signal by determining a difference between the first difference signal and the delayed first difference signal; (d) detecting a polarity of the residual echo included in the first difference signal or the second difference signal by selectively applying the first and second difference signals to a polarity decision circuit; and (e) obtaining the error signal based on the output of the polarity decision circuit (FIGS. 6 and 7).

A third aspect of this invention takes the form of a method of cancelling an echo using an adaptive digital filter in full-duplex data transmission over a two-wire circuit, the adaptive digital filter updating the tap coefficients thereof by an error signal applied thereto and producing an echo replica, the method comprising the steps: (a) subtracting the echo replica from a mixed signal which consists of a received signal and the echo, and obtaining a first difference signal by the subtraction, the first difference signal including the received signal and a residual echo; (b) delaying the first difference signal in a manner to produce a delayed first difference signal; (c) obtaining a second difference signal by determining a difference between the first difference signal and the delayed first difference signal; (d) correlating the polarities of the echo replica and the second difference signal, and multiplying the correlated signal by a constant; and (e) obtaining the error signal by providing the polarity of the second difference signal with the multiplied correlated signal (FIGS. 8 and 9).

A fourth aspect of this invention takes the form of a method of cancelling an echo using an adaptive digital filter in full-duplex data transmission over a two-wire circuit, the adaptive digital filter updating the tap coefficients thereof by an error signal applied thereto and producing an echo replica, the method comprising the steps: (a) subtracting the echo replica from a mixed signal which consists of a received signal and the echo, and obtaining a first difference signal by the subtraction, the first difference signal including the received signal and a residual echo; (b) delaying the first difference signal in a manner to produce a delayed first difference signal; (c) obtaining a second difference signal by determining a difference between the first difference signal and the delayed first difference signal; (d) correlating the polarities of the echo replica and the first or second difference signals at a polarity decision circuit by selectively applying the first and second difference signals to the polarity decision circuit, and multiplying the correlated signal by a constant; and (e) obtaining the error signal by providing the polarity of the second difference signal with the multiplied correlated signal (FIGS. 10 and 11).

A fifth aspect of this invention takes the form of a method of cancelling an echo using an adaptive digital filter in full-duplex data transmission over a two-wire circuit, the adaptive digital filter updating the tap coefficients thereof by an error signal applied thereto and producing an echo replica, the method comprising the steps: (a) subtracting the echo replica from a mixed signal which consists of a received signal and the echo, and obtaining a first difference signal by the subtraction, the first difference signal including the received signal and a residual echo; (b) delaying the first difference signal in a manner to produce a delayed first difference signal; (c) obtaining a second difference signal by determining a difference between the first difference signal and the delayed first difference signal; (d) correlating the polarities of the echo replica and the first difference signal, and multiplying the correlated signal by a constant; and (e) obtaining the error signal by providing the polarity of the second difference signal with the multiplied correlated signal (FIGS. 12 and 13).

A sixth aspect of this invention takes the form of a method of cancelling an echo using an adaptive digital filter in full-duplex data transmission over a two-wire circuit, the adaptive digital filter updating the tap coefficients thereof by an error signal applied thereto and producing an echo replica, the method comprising the steps: (a) subtracting the echo replica from a mixed signal which consists of a received signal and the echo, and obtaining a first difference signal by the subtraction, the first difference signal including the received signal and a residual echo; (b) delaying the first difference signal in a manner to produce a delayed first difference signal; (c) obtaining a second difference signal by determining a difference between the first difference signal and the delayed first difference signal; (d) correlating the polarities of the echo replica and the first difference signal, and multiplying the correlated signal by a constant; and (e) selectively obtaining one of the polarities of the first and second difference signals, and obtaining the error signal by providing the selected polarity with the multiplied correlated signal (FIGS. 14 and 15).

BRIEF DESCRIPTION OF THE DRAWINGS

The features and advantages of the present invention will become more clearly appreciated from the following description when taken in conjunction with the accompanying drawings in which like blocks are denoted by like reference numerals and in which:

FIGS. 5 to 15 are block diagrams which show second to twelfth embodiments of this invention, respectively.

DETAILED DESCRIPTION OF THE PREFERRED EMBODIMENTS

This invention is based on the principle that there is a non-zero probability that the sampled values at the time interval l·T (wherein l is a positive integer and T is one symbol interval (seconds)) of a transmission code used are identical with each other with respect to their absolute levels.

Figure 1:
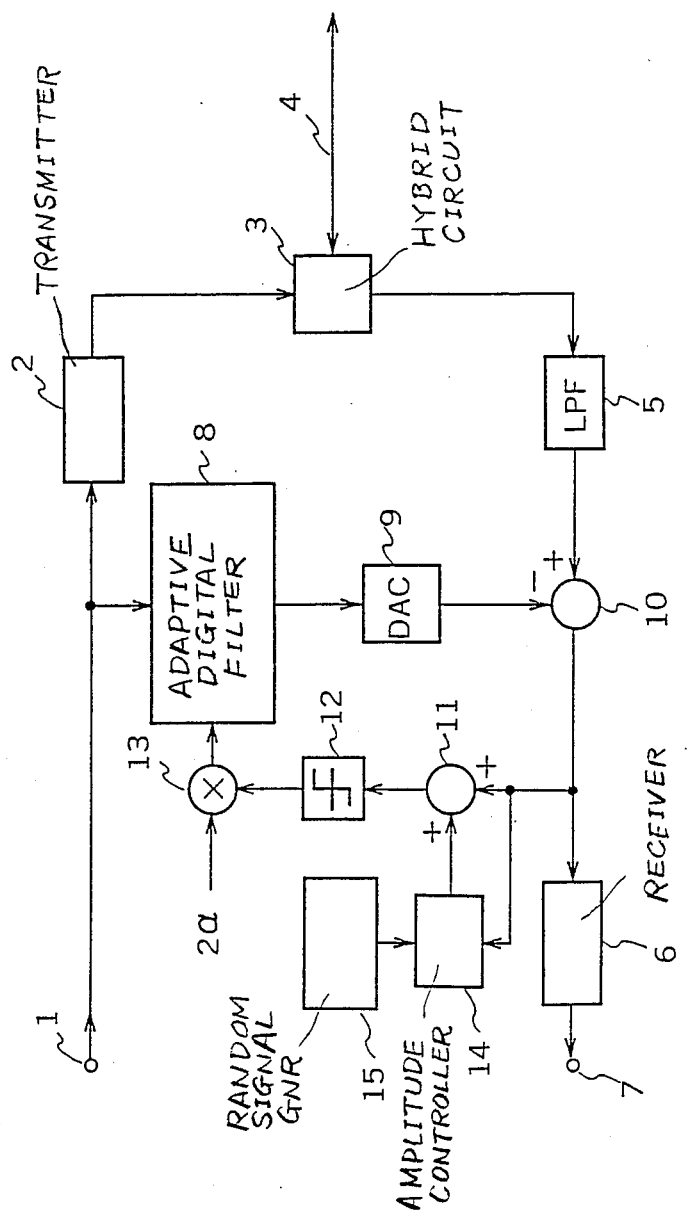
FIG. 1 is a block diagram showing a known echo canceller described hereinbefore.
Figure 2:
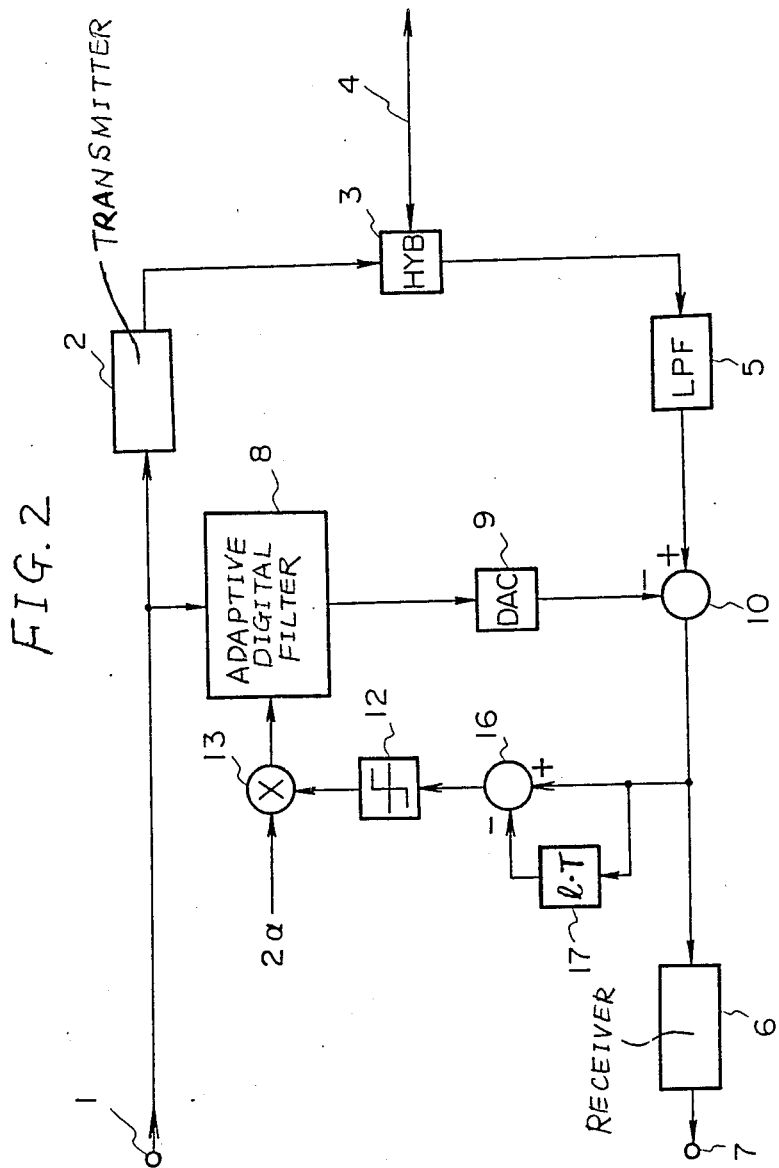
FIG. 2 is a block diagram showing a first embodiment of the echo canceller according to this invention.

Reference is now made to FIG. 2, wherein there is shown in block diagram form the first embodiment according to this invention. Comparing the arrangements of FIGS. 1 and 2 reveals that the latter arrangement includes a subtracter 16 and a delay circuit 17 in place of the adder 11, the amplitude controller 14 and the random signal generator 15 of the former arrangement. The delay circuit 17 provides the incoming signal with a delay corresponding to l·T. The remaining portions of the circuitry shown in FIGS. 1 and 2 are identical with each other.

Prior to the description of the FIG. 2 arrangement, reference will be made to FIGS. 3(a), 3(b), 4(a) and 4(b).

Figure 3A:
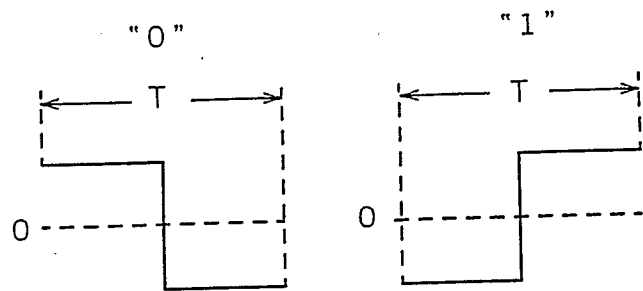
FIGS. 3(a) and 3(b) illustrate biphase and MSK (Minimum-Shift Keying) codes, respectively.
Figure 3B:
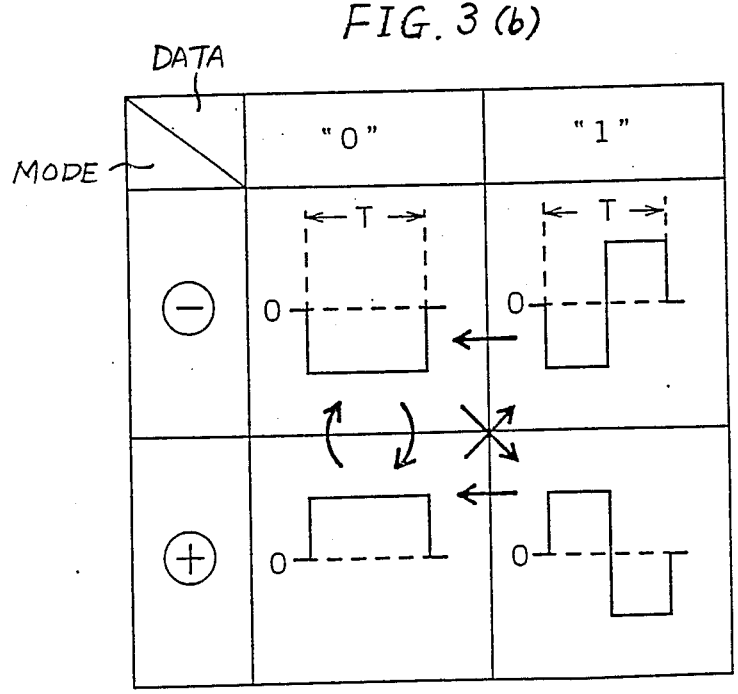

FIGS. 3(a) and 3(b) illustrate, by way of example, the waveforms of binary transmission codes, viz., biphase and MSK codes, respectively. The transmission waveforms are outputted from the transmitter 2.

As shown in FIG. 3(a), "0" and "1" in the biphase code have opposite polarities, with each other, which reverse at the center of the symbol interval T. Therefore each biphase bit is balanced within one bit duration with respect to the polarities. On the other hand, there are two modes for each of "0" and "1" of the MSK code as shown in FIG. 3(b). Viz., each of the MSK bits "0" and "1" has two modes "+" and "−" with opposite polarities. The possible mode transitions between two MSK bits are represented by bold solid arrows. Viz., each mode transition is determined by its preceding mode. As shown, the MSK bit "1" is balanced with respect to the polarities, but the bit "0" is defined by one polarity. Although the MSK bit "0" assumes no different polarity in one bit duration, the total DC (direct current) component thereof is negligible.

Figure 4A:
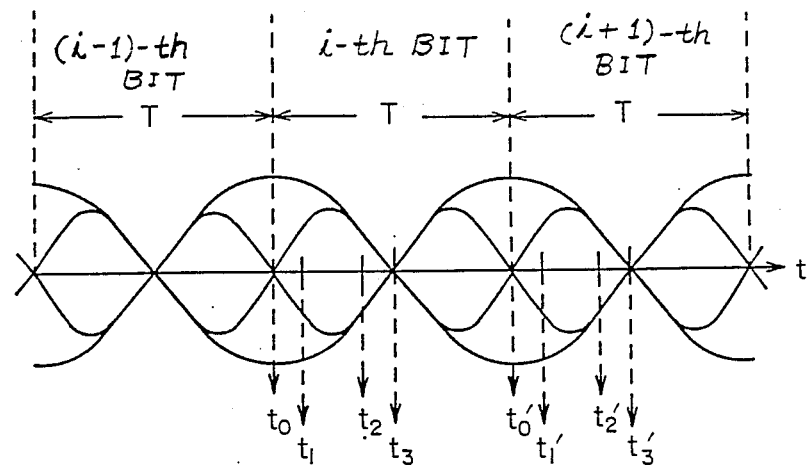
FIGS. 4(a) and 4(b) illustrate oscillograms ("eye patterns") which correspond to the codes shown in FIGS. 3(a) and 3(b), respectively.
Figure 4B:
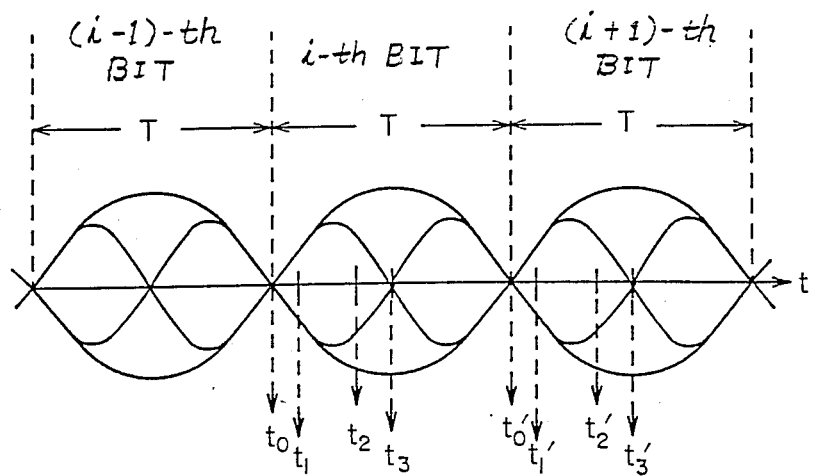

FIGS. 4(a) and 4(b) illustrate "eye patterns" which correspond to the biphase and MSK codes shown in FIGS. 3(a) and 3(b), respectively.

In FIG. 4(a) let us suppose four pairs of sampling points (($t_0$, $t_0'$), ($t_1$, $t_1'$), ($t_2$, $t_2'$), ($t_3$, $t_3'$)) extracted respectively from i-th and (i+1)-th bits, wherein the sampling points of each pair are apart by l·T (in this case l is 1). Denoting the difference ($t_m'$)−($t_m$) (wherein m=0, 1, 2, 3) by $A_m$, $A_m$ is given in the following Table I.

TABLE I

| (i − 1)-th bit | i-th bit | (i + 1)-th bit | $A_0$ | $A_1$ | $A_2$ | $A_3$ |
|---|---|---|---|---|---|---|
| 0 | 0 | 0 | 0 | 0 | 0 | 0 |
| 0 | 0 | 1 | N | N | N | 0 |
| 0 | 1 | 0 | P | P | P | 0 |
| 0 | 1 | 1 | P | P | 0 | 0 |
| 1 | 0 | 0 | N | N | 0 | 0 |
| 1 | 0 | 1 | N | N | N | 0 |
| 1 | 1 | 0 | P | P | P | 0 |
| 1 | 1 | 1 | 0 | 0 | 0 | 0 | wherein "P" and "N" denote positive and negative values, respectively. Assuming that the probability of each of bits "0" and "1" occurring is ½, Table I shows that the probabilities of $A_0=0$, $A_1=0$, $A_2=0$ and $A_3=0$ are respectively ¼, ¼, ½ and 1. This is applicable to the other case wherein any points other than those shown in FIG. 4(a) are sampled while maintaining the sampling interval equal to l·T. In general, if any sampled value of the received signal is subtracted from the sampled value preceding same by l·T, the minimum probability of the difference being zero is ¼. In the case of the MSK code, the $A_m$ is represented as shown in Table II listed below.

TABLE II

| i-th bit | | (i + 1)-th bit | | | | | |
|---|---|---|---|---|---|---|---|
| (mode) | (data) | (mode) | (data) | $A_0$ | $A_1$ | $A_2$ | $A_3$ |
| + | 0 | − | 0 | 0 | N | N | N |
| − | 0 | + | 0 | 0 | P | P | P |
| + | 0 | − | 1 | 0 | N | N | N |
| − | 0 | + | 1 | 0 | P | P | P |
| + | 1 | + | 0 | 0 | 0 | P | P |
| − | 1 | − | 0 | 0 | 0 | N | N |
| + | 1 | + | 1 | 0 | 0 | 0 | 0 |
| − | 1 | − | 1 | 0 | 0 | 0 | 0 |

Assuming similarly that the probability of occurrences of each of bits "0" and "1" is ½, Table II shows that the probabilities of $A_0=0$, $A_1=0$, $A_2=0$ and $A_3=0$ are respectively 1, ½, ¼ and ¼. This is applicable to the other sampling cases if any pair of points is sampled with the sampling interval of the symbol interval T. In general, in the event that any sampled value of the received signal is subtracted from the sampled value preceding same by 1·T, the minimum possibility of the difference being zero is also ¼.

Extending the above discussion to the transmission codes other than those shown in FIGS. 3(a) and 3(b), also shows that the minimum probability of $A_m=0$ is not zero.

FIG. 2 illustrates the echo canceller (the first embodiment) arranged according to the principle discussed previously with reference to FIGS. 3(a) through 4(b). As mentioned above, ensuring the correct operation of the adaptive digital filter 8, requires that the possibility for determining the polarity of the residual echo at the polarity decision circuit 12 is not zero. To this end the delay circuit 17 and the subtracter 16 are provided.

The delay circuit 17 supplies the difference signal from the subtracter with a delay 1·T and applies the delayed difference signal to the subtracter 16. It is apparent from the above discussion that the received signal components present in the output of the subtracter 16, are cancelled with a probability of the components being zero more than ¼. On the other hand, the delayed residual echo is assumed to be a random noise in that it does not correlate with the non-delayed residual echo. As a result, the probability that the polarity of the non-delayed residual echo is correctly detected takes a value exceeding zero, which leads to the correct operation of the adaptive digital filter 8.

FIG. 5 illustrates in block diagram form a second embodiment according to this invention. The difference between the first and second embodiments (FIGS. 2 and 5) is that the latter arrangement is provided with an adder 18 in place of the subtracter 16. The remaining portions of both are identical with each other. The FIG. 5 embodiment is to detect the polarity of the output of the adder 18.

Similar to the description made in connection with FIG. 4(a), let us suppose four pairs of sampling points $((t_0, t_0'), (t_1, t_1'), (t_2, t_2'), (t_3, t_3'))$ extracted respectively from i-th and (i+1)-th bit, wherein the sampling points of each pair are apart by one symbol interval T. Denoting the difference $(t_m')-(t_m)$ (wherein m=0, 1, 2, 3) by $B_m$, $B_m$ is given as shown in the following Table III.

TABLE III

| (i − 1)-th bit | i-th bit | (i + 1)-th bit | $B_0$ | $B_1$ | $B_2$ | $B_3$ |
|---|---|---|---|---|---|---|
| 0 | 0 | 0 | 0 | P | P | 0 |
| 0 | 0 | 1 | N | N | 0 | 0 |
| 0 | 1 | 0 | 0 | 0 | 0 | 0 |
| 0 | 1 | 1 | N | N | N | 0 |
| 1 | 0 | 0 | P | P | P | 0 |
| 1 | 0 | 1 | 0 | 0 | 0 | 0 |
| 1 | 1 | 0 | P | P | 0 | 0 |
| 1 | 1 | 1 | 0 | N | N | 0 |

On the other hand, in the case of the MSK codes, the $B_m$ is represented as shown in Table IV listed below.

TABLE IV

| i-th bit | | (i + 1)-th bit | | | | | |
|---|---|---|---|---|---|---|---|
| (mode) | (data) | (mode) | (data) | $B_0$ | $B_1$ | $B_2$ | $B_3$ |
| + | 0 | − | 0 | 0 | 0 | 0 | 0 |
| − | 0 | + | 0 | 0 | 0 | 0 | 0 |
| + | 0 | − | 1 | 0 | 0 | P | P |
| − | 0 | + | 1 | 0 | 0 | N | N |
| + | 1 | + | 0 | 0 | P | P | P |
| − | 1 | − | 0 | 0 | N | N | N |
| + | 1 | + | 1 | 0 | P | P | 0 |
| − | 1 | − | 1 | 0 | N | N | 0 |

Similarly, assuming that the probability of occurrences of each of bits "0" and "1" is ½, Table III shows that the probabilities of $B_0=0$, $B_1=0$, $B_2=0$ and $B_3=0$ are respectively ½, ¼, ½ and 1, while Table IV shows that the probabilities of $B_0=0$, $B_1=0$, $B_2=0$ and $B_3=0$ are respectively 1, ½, ¼ and ½. These are applicable to the other cases with different sampling points if any pair of points is sampled with the sampling interval of the symbol interval T. In general, in the event that any sampled value of a received signal is subtracted from the sampled value preceding same by 1·T, the minimum probability of the difference being zero is also ¼.

The remaining features of the second embodiment are identical to those of the first one and hence a detailed description thereof will be omitted for simplicity. It is apparent that with the arrangement shown in FIG. 5 the same result as that shown in FIG. 2 is obtainable.

FIG. 6 illustrates the third embodiment according to this invention. The arrangement shown in FIG. 6 is identical to that shown in FIG. 2 except that the former is additionally provided with a switch 24. This switch has two inputs respectively coupled to the outputs of the subtracters 16 and 10, and has an output coupled to the polarity decision circuit 12.

As seen from the "eye patterns" shown in FIGS. 4(a) and 4(b), the received signal intersects the zero levels. This means that at the zero-level intersecting points of the received signal, the difference signal from the subtracter 10 includes no component of the received signal. It follows that the subtraction at the subtracter 16 is no longer needed at these particular points and is preferably omitted to directly apply the output of the subtracter 10 to the polarity decision circuit 12. To this end, the switch 24 is provided.

The sampling period at the polarity decision circuit 12 is determined by T/R (wherein R is an interpolation factor). By appropriately selecting the sampling phase, there exist two times (assuming R is 4), within T (seconds), at each of which the zero-level intersecting point of the received signal is identical to the sampling point. The receiver 6 detects the zero-level intersecting points of the receive signal and produces timing pulses which are used to control the switch 24. Consequently, the switch 24 is controlled by the timing pulses from the receiver 6 to apply the output of the subtracter 10 to the circuit 12 when the sampling points are identical to the zero-intersecting points, and to apply the output of the subtracter 16 to the circuit 12 at the other sampling points. Although it is assumed that R has a value of 4 in the above, R may be any positive integer greater than 2. The remaining features of this embodiment are essentially identical to those of the first embodiment and hence a detailed description will be omitted for simplicity.

Figure 7:
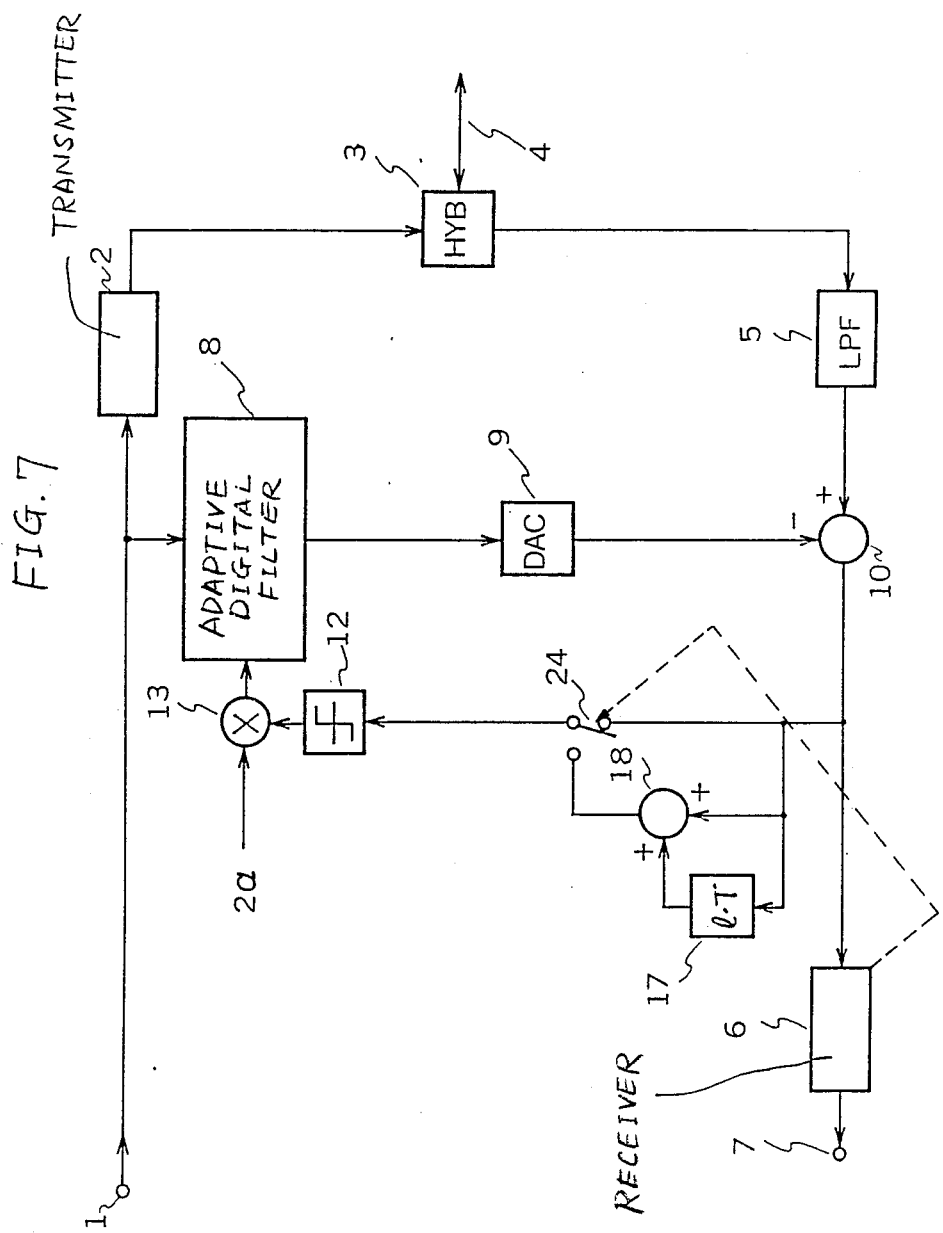

FIG. 7 illustrates the fourth embodiment according to this invention. The arrangement shown in FIG. 7 is basically the same as that shown in FIG. 5 except that the former is additionally provided with a switch 24. The operations of the switch 24 and the adder 18 are the same as those discussed in detail in the arrangements shown in FIGS. 2 and 6 (viz., first and third embodiments), respectively, and hence further descriptions thereof will be omitted for simplicity.

Figure 8:
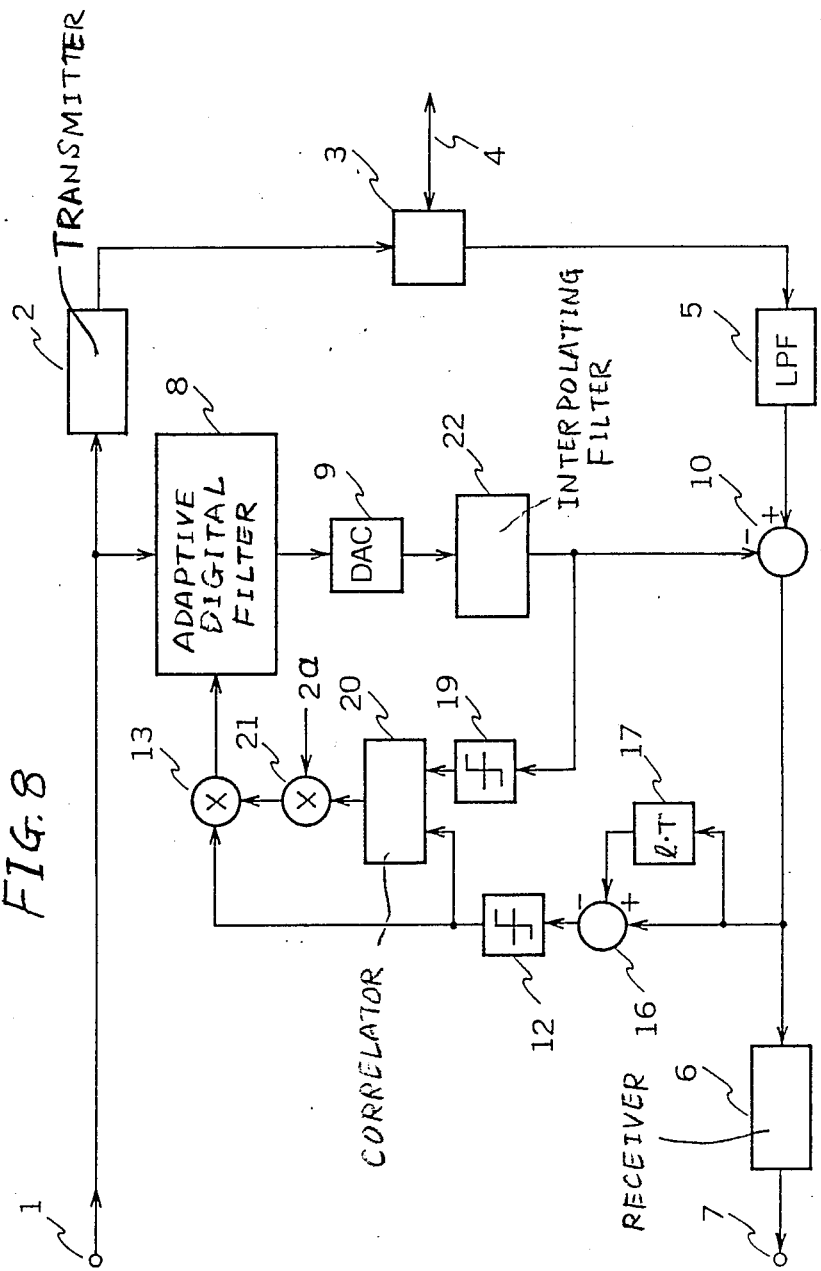

FIG. 8 illustrates the fifth embodiment according to this invention. This arrangement is essentially identical to that shown in FIG. 2. However, in this case the former is additionally provided with four components, viz., a polarity decision circuit 19, a correlator 20, a multiplier 21 and an interpolating filter 22. This embodiment features that a simple and small-scale echo canceller can be achieved together with a small amount of convergence time.

In FIG. 8, the output of the D/A converter 9 (viz., echo replica) is applied to the filter 22 which functions to suppress high frequency components of the incoming signal. The filter 22 applies its output to the subtracter 10 as mentioned in the foregoing embodiments and also to the polarity decision circuit 19. This circuit 19 outputs the polarity of the echo replica. The correlator 20 is supplied with the outputs of the two polarity decision circuits 12 and 19, and correlates the two outputs applied. The output of the correlator 20 is then multiplied by $2\alpha$ at the multiplier 21, and is applied to the other multiplier 13.

On the other hand, if the residual echo (included in the output of the subtracter 10) is large, then the polarities of the residual echo and the echo replica have a correlation. Contrarily, in the event that the residual echo is small, the two polarities have no correlation. Consequently, the correlator 20 produces a large output when the residual echo is large, while produces a small output when the residual echo is small. The output of the correlator 20 is multiplied by $2\alpha$ at the multiplier 21. The multiplier 13 provides the output of the multiplier 21 with the polarity of the output of the polarity decision circuit 12, and applies its output to the adaptive digital filter as the error signal. Thus, the convergence time can be shortened to a great extent. The remaining features of this embodiment are the same as those of the first embodiment.

Figure 9:
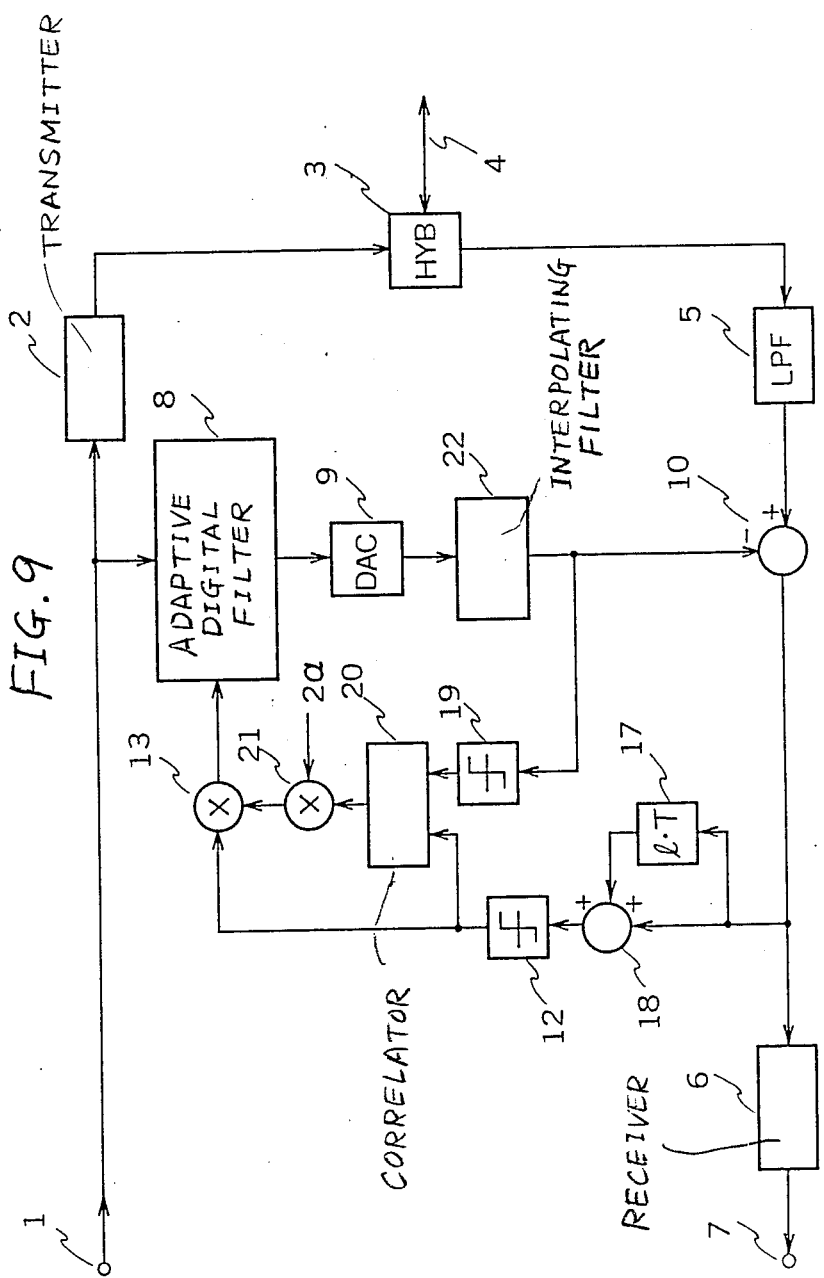

FIG. 9 illustrates in block diagram form the sixth embodiment according to this invention. The difference between the fifth and sixth embodiments (FIGS. 8 and 9) is that the latter arrangement is provided with an adder 18 in place of the subtracter 16. The remaining portions of both are identical with each other. The features of the sixth embodiment can be understood with ease from the descriptions of FIGS. 5 and 8, and hence further discussion of the FIG. 9 arrangement will be omitted.

Figure 10:
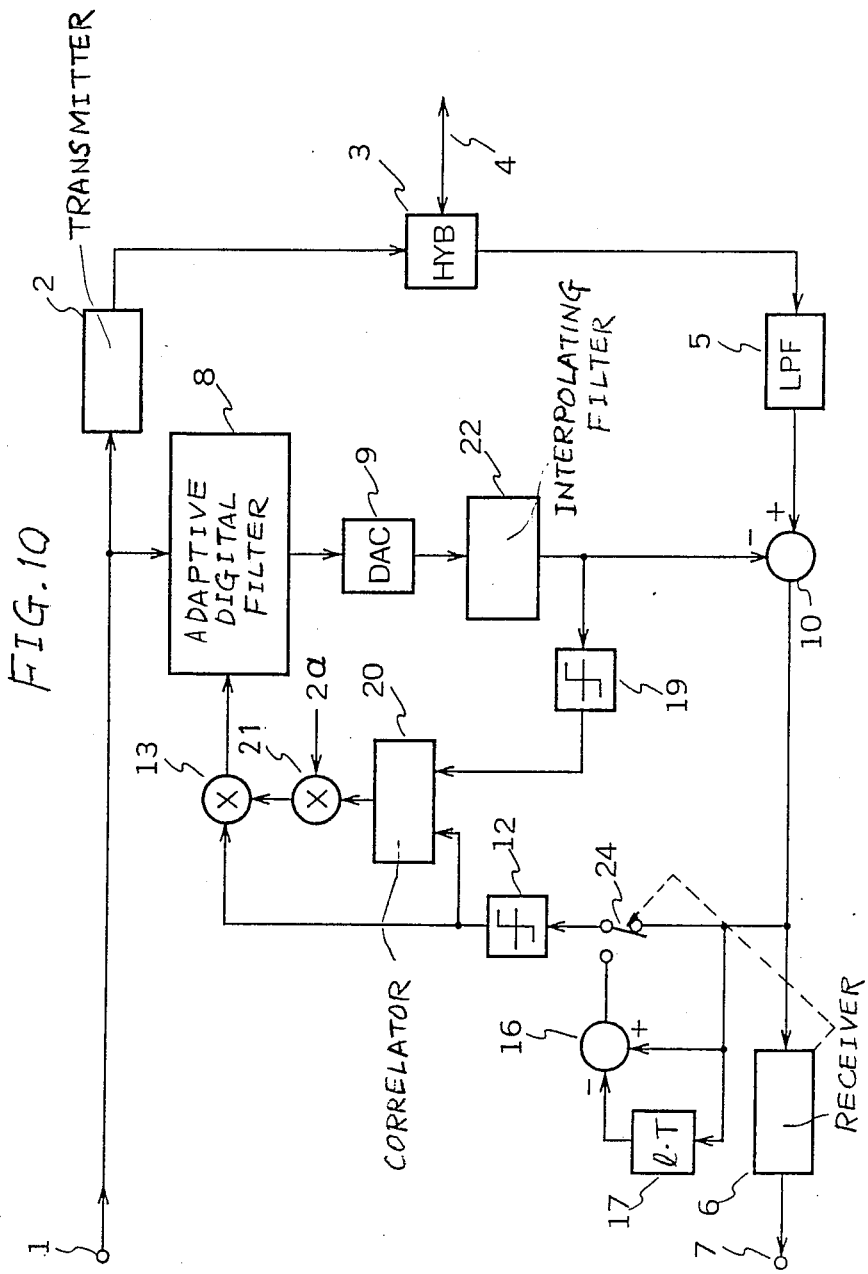

FIG. 10 illustrates the seventh embodiment according to this invention. The arrangement shown in FIG. 10 is identical to that shown in FIG. 8 except that the former is additionally provided with a switch 24. The remaining portions of both embodiments (FIGS. 10 and 8) are identical with each other. The features of the seventh embodiment can readily be understood from the descriptions of FIGS. 6 and 8, and hence the further discussions of the FIG. 10 arrangement will be omitted.

Figure 11:
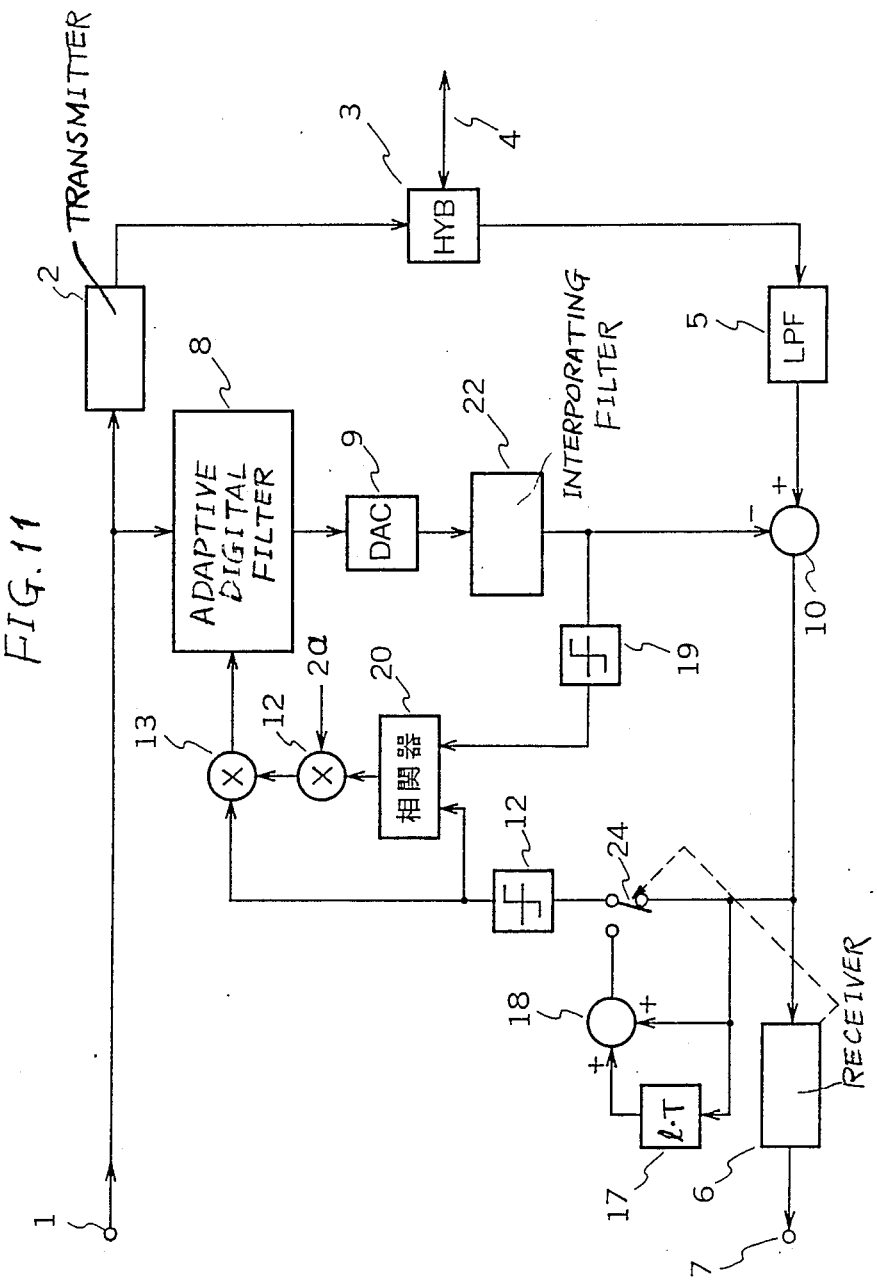

FIG. 11 illustrates in block diagram form the eighth embodiment according to the present invention The difference between the seventh and eighth embodiments (FIGS. 10 and 11) comes in that the latter arrangement is provided with an adder 18 in place of the subtracter 16. The remaining portions of both are identical. Accordingly, it is deemed that the features of the FIG. 11 embodiment will be readily understood from the preceding embodiments and hence a description thereof will be omitted for simplicity.

Figure 12:
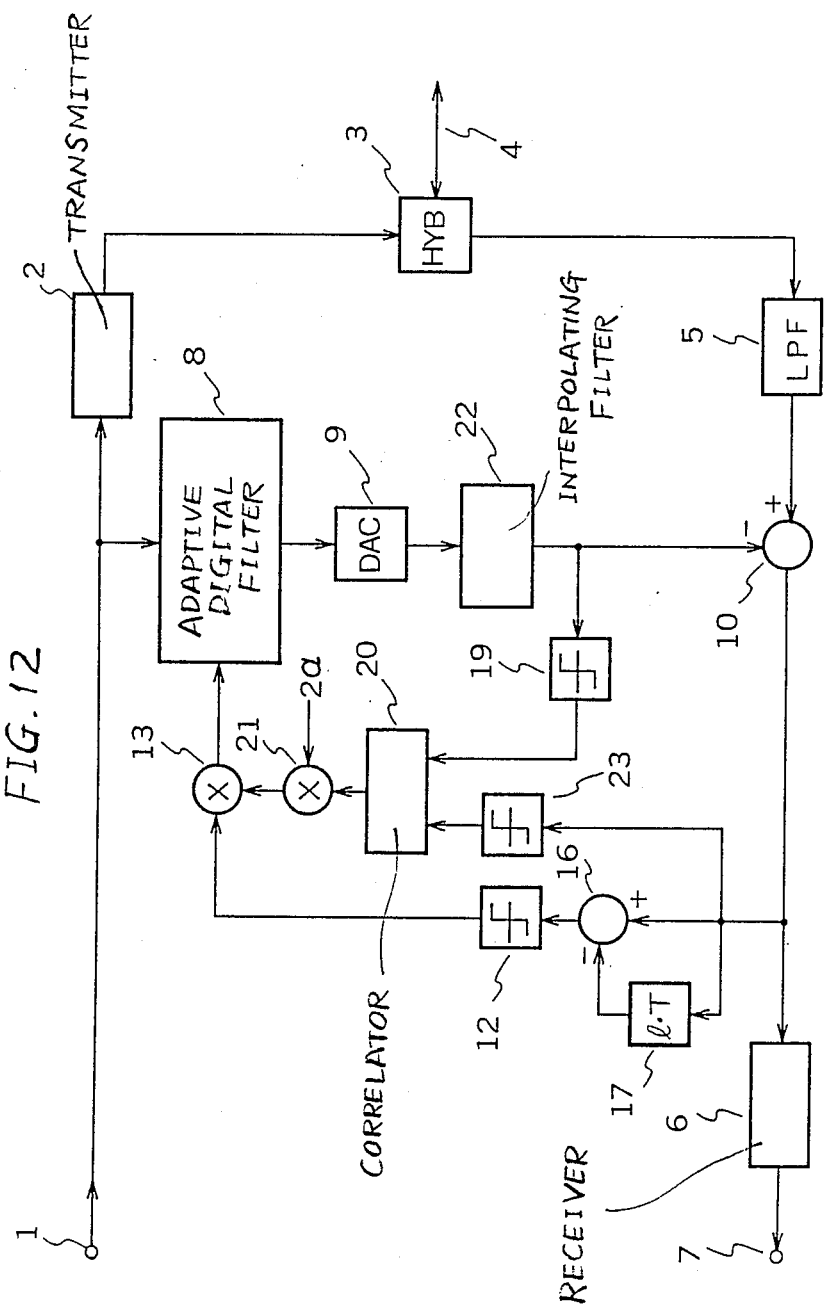

FIG. 12 illustrates in block diagram form the nineth embodiment according to this invention, which is a modification of the FIG. 8 arrangement. As shown the arrangement of FIG. 12 is identical to that of FIG. 8 except that the correlator 20 of the former receives the polarity data of the residual echo through a newly added polarity decision circuit 23 whose input is coupled to the output of the subtracter 10. Similar to the FIG. 8 embodiment, the correlator 20 is supplied with the outputs of the two polarity decision circuits 19 and 23, and correlates the two outputs applied. Other than these differences, the nineth embodiment is identical to the fifth one (FIG. 8) and hence further discussion is omitted.

Figure 13:
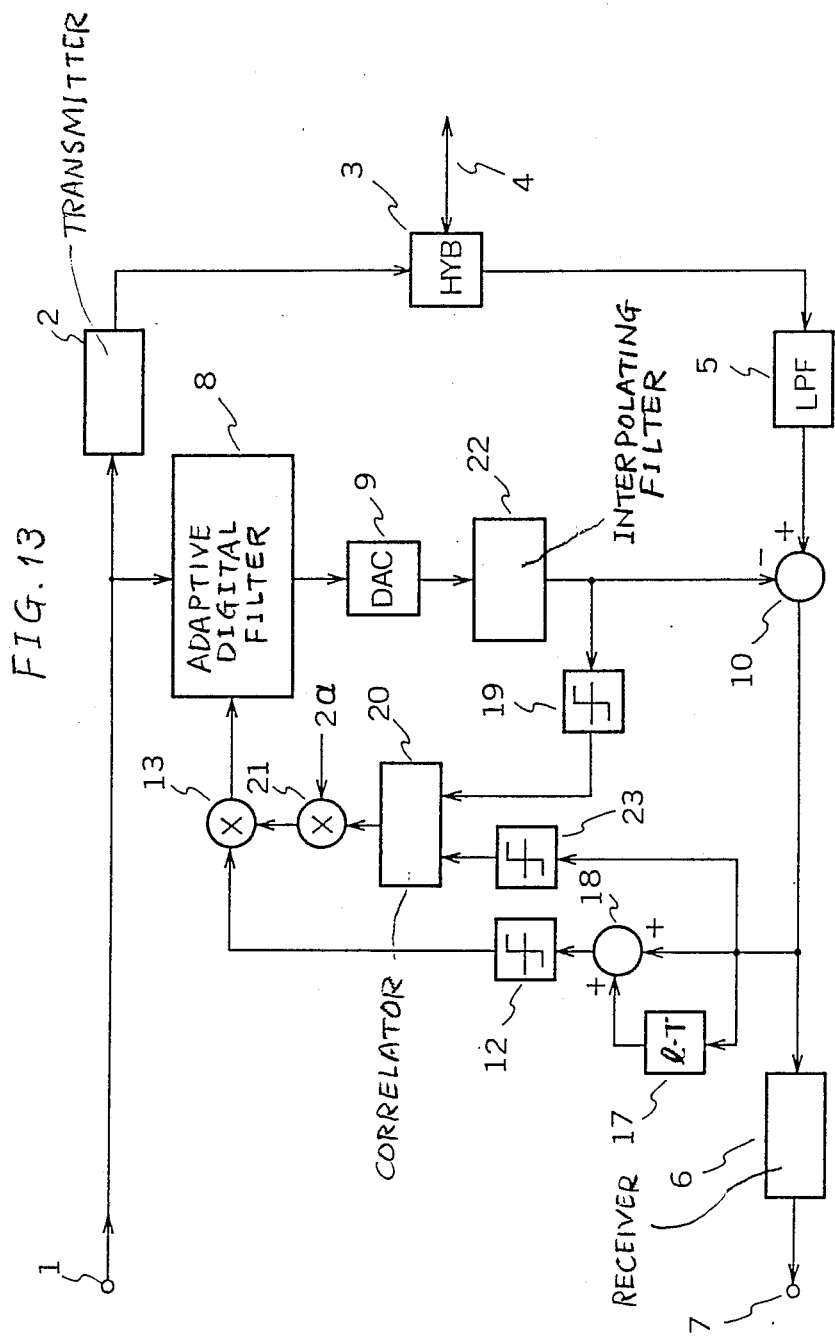

FIG. 13 illustrates in block diagram form the tenth embodiment according to this invention. The difference between the nineth and tenth embodiments (FIGS. 12 and 13) comes in that the latter arrangement is provided with an adder 18 in place of the subtracter 16. The remaining portions of both are identical with each other. It is clear that the features of the tenth embodiment can be understood with ease from the preceding embodiments as discussed above.

Figure 14:
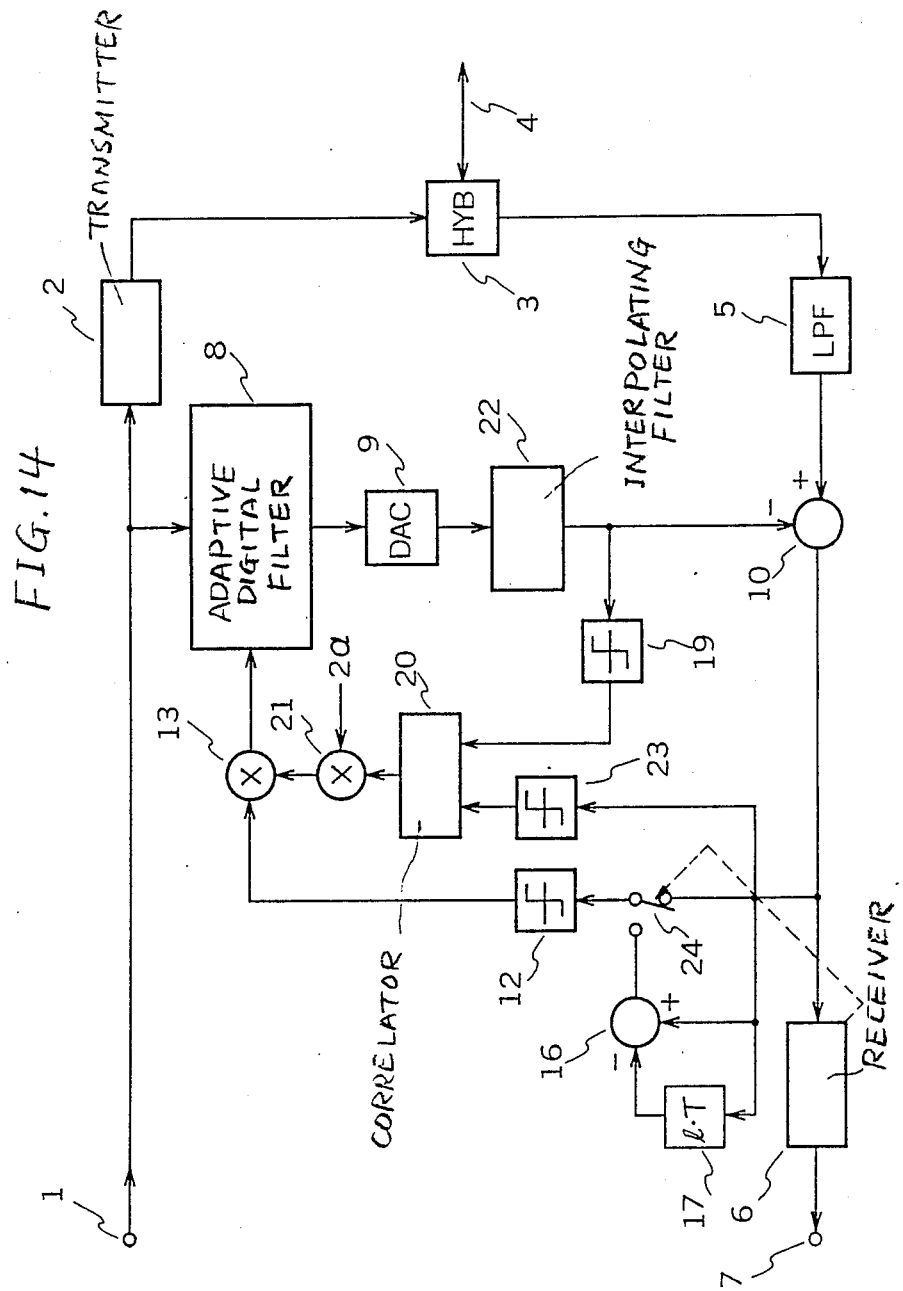
Figure 15:
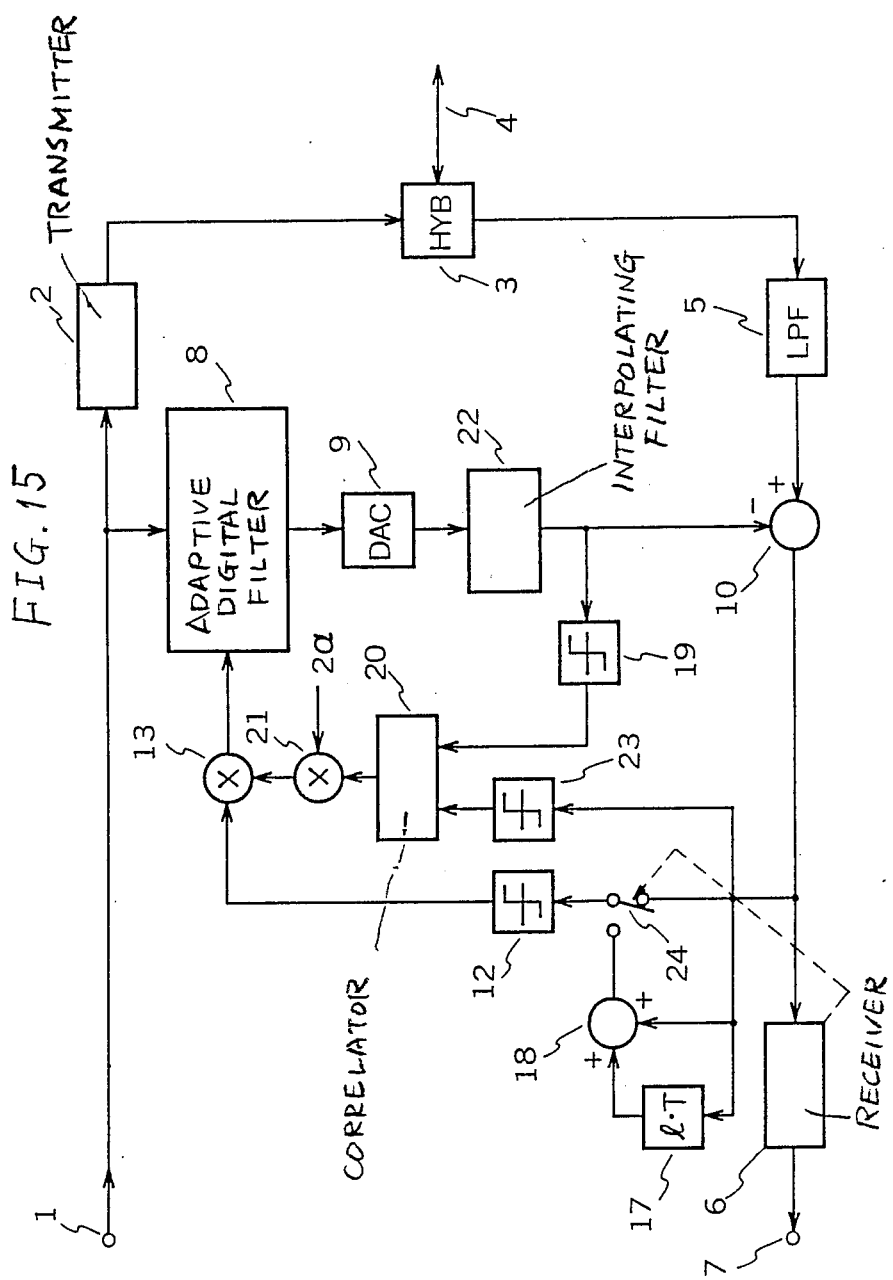

Finally, FIGS. 14 and 15 show respectively the eleventh and twelfth embodiments according to this invention, which are respectively identical to the nineth and tenth embodiments (FIGS. 12 and 13) with the exceptions that each of the latter-mentioned arrangements is provided with the switch 24. The functions of this switch is described in detail with reference to FIG. 6, so that further discussion will not be needed.

In the foregoing, various embodiments according to this invention have been described. In these embodiments, a line loss equalizer, which compensates for a line loss along the two-wire, can be installed within the receiver 6 or between the low-pass filter 5 and the subtracter 10. Further, the adaptive digital filter 8 takes different circuit configurations depending on the cases using biphase and MSK codes. Still further, the delay provided by the delay circuit 17 is not restricted to the exact value of 1·T, but may be in the vicinity thereof in practice. Furthermore, the delay circuit 17 may be constructed by a plurality of shift registers which are coupled in series or in parallel.

The foregoing description shows only preferred embodiments of the present invention. Various modifications are apparent to those skilled in the art without departing from the scope of the present invention which is only limited by the appended claims.

What is claimed is:

1. A method of cancelling an echo using an adaptive digital filter in full-duplex data transmission over a two-wire circuit, said adaptive digital filter updating the tap coefficeints thereof by an error signal applied thereto and producing an echo replica, said method comprising the steps:
   (a) subtracting the echo replica from a mixed signal which consists of a received signal and the echo, and obtaining a first difference signal by the subtraction, said first difference signal including the received signal and a residual echo;
   (b) delaying said first difference signal in a manner to produce a delayed first difference signal;

(c) obtaining a second difference signal by determining a difference between said first difference signal and said delayed first difference signal;

(d) correlating the polarities of the echo replica and said second difference signal to produce a correlated signal, and multiplying the correlated signal by a constant to produce a multiplied signal; and (e) obtaining the error signal by multiplying the multiplied correlated signal by the polarity of said second difference signal.

2. A method as claimed in claim 1, wherein said second difference signal is obtained by subtraction.

3. A method as claimed in claim 1, wherein said second difference signal is obtained by addition.

4. A method of cancelling an echo using an adaptive digital filter in full-duplex data transmission over a two-wire circuit, said adaptive digital filter updating the tap coefficients thereof by an error signal applied thereto and producing an echo replica, said method comprising the steps:

(a) subtracting the echo replica from a mixed signal which consists of a received signal and the echo, and obtaining a first difference signal by the subtraction, said first difference signal including the received signal and a residual echo;

(b) delaying said first difference signal in a manner to produce a delayed first difference signal;

(c) obtaining a second difference signal by determining a difference between said first difference signal and said delayed first difference signal;

(d) correlating the polarities of the echo replica and said first or second difference signals at a polarity decision circuit by selectively applying said first and second difference signals to said polarity decision circuit, to produce a correlated signal, and multiplying the correlated signal by a constant to produce a multiplied signal; and (e) obtaining the error signal by multiplying the multiplied correlated signal by the polarity of said second difference signal.

5. A method as claimed in claim 4, wherein said second difference signal is obtained by subtraction.

6. A method as claimed in claim 4, wherein said second difference signal is obtained by addition.

7. A method of cancelling an echo using an adaptive digital filter in full-duplex data transmission over a two-wire circuit, and adaptive digital filter updating the tap coefficients thereof by an error signal applied thereto and producing an echo replica, said method comprising the steps:

(a) subtracting the echo replica from a mixed signal which consists of a received signal and the echo, and obtaining a first difference signal by the subtraction, said first difference signal including the received signal and a residual echo;

(b) delaying said first difference signal in a manner to produce a delayed first difference signal;

(c) obtaining a second difference signal by determining a difference between said first difference signal and said delayed first difference signal;

(d) correlating the polaritites of the echo replica and said first difference signal to produce a correlated signal, and multiplying the correlated signal by a constant to produce a multiplied signal; and (e) obtaining the error signal by multiplying the multiplied correlated signal by the polarity of said second difference signal.

8. A method as claimed in claim 7, wherein said second difference signal is obtained by subtraction.

9. A method as claimed in claim 7, wherein said second difference signal is obtained by addition.

10. A method of cancelling an echo using an adaptive digital filter in full-duplex data transmission over a two-wire circuit, said adaptive digital filter updating the tap coefficients thereof by an error signal applied thereto and producing an echo replica, said method comprising the steps:

(a) subtracting the echo replica from a mixed signal which consists of a received signal and the echo, and obtaining a first difference signal by the subtraction, said first difference signal including the received signal and a residual echo;

(b) delaying said first difference signal in a manner to produce a delayed first difference signal;

(c) obtaining a second difference signal by determining a difference between said first difference signal and said delayed first difference signal;

(d) correlating the polarities of the echo replica and said first difference signal to produce a correlated signal, and multiplying the correlated signal by a constant to produce a multiplied signal; and (e) selectively obtaining one of the polarities of said first and second difference signals, and obtaining the error signal by multiplying the multiplied correlated signal by the polarity of said second difference signal.

11. A method as claimed in claim 10, wherein said second difference signal is obtained by subtraction.

12. A method as claimed in claim 10, wherein said second difference signal is obtained by addition.

* * * * *